T. A. HOFFMANN.
Improvement in Generation of Ozone and in Treating Liquids with the Same.
No. 128,227. Patented June 25, 1872.
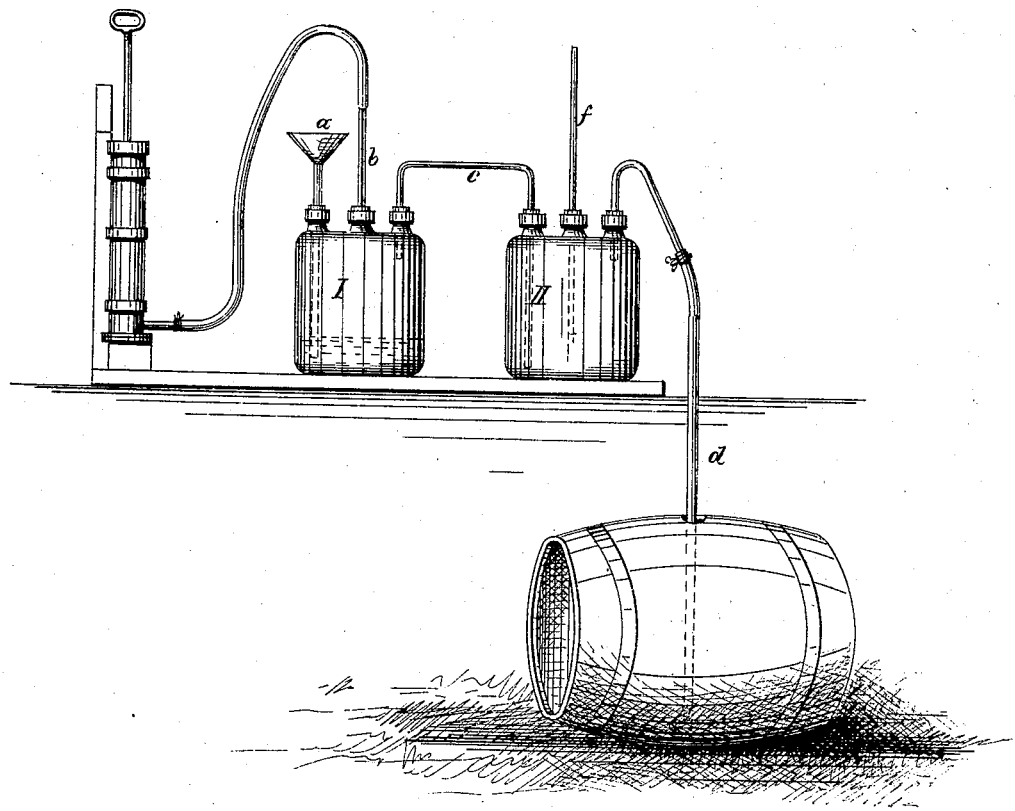

128,227

UNITED STATES PATENT OFFICE.

THEODORE A. HOFFMANN, OF BEARDSTOWN, ILLINOIS.

IMPROVEMENT IN THE GENERATION OF OZONE, AND IN TREATING LIQUIDS WITH THE SAME.

Specification forming part of Letters Patent No. 128,227, dated June 25, 1872.

I, THEODORE A. HOFFMANN, of Beardstown, county of Cass and State of Illinois, have invented a certain new Process for a Continued Generation of "Ozone or Ozonized Air," of which the following is a specification:

For generating the "ozone or ozonized air" I use two vessels in the shape of Woulfe's bottles, with three necks each; also one air-pump or a blower or a bellows, with tubes of lead, India rubber, or glass, of a diameter and length as the circumstances may demand, for conveying the gas.

The vessel No. I is the generator, made of heavy sheet-lead. Through the leaden funnel-tube $a$ I introduce a quantity of sulphuric acid, (about 65° Baumé,) one-eighth or one-tenth of the capacity of vessel. On the center tube $b$, made of lead, is attached the India-rubber tube from the air-pump or blower. The funnel-tube $a$ and the center tube $b$ of the generator have to dip into the liquid without reaching the bottom of the generator. The third neck is provided with a coupling for a conveying-tube, $c$, to convey the gas into the vessel No. II, which is filled two-thirds of its capacity with clean water, into which the conveying-tube $c$ from the generator is plunged for washing the gas. The center neck of the vessel No. II is provided with a safety-tube, $f$, or a check-valve. The third neck has a coupling with an India-rubber tube of suitable length to convey the washed gas to the place or vessel where its action is required. Through the opening of the funnel-tube $a$, in the generator No. I, I introduce from time to time in small portion of one-quarter or one-half ounce of the crude permanganate or hypermanganate of potash, (in a coarse granulated state, free from chlorides,) in such intervals as to correspond with the working of the air-pump or blower, until the amount reaches twenty-five or thirty per cent. of the acid applied.

By the action of the air-pump or blower the atmospheric air is blown into the mixture of the permanganate or hypermanganate of of potash, with sulphuric acid in the generator, and passing decomposed as "ozone or ozonized air" through the conveying-tube $c$ into the wash apparatus No. II, and from there through the conveying-tube $d$ into the place or vessel for action. On the end of this tube I fasten a fine perforated tube of tin, like that in the model, filled loosely with a porous substance, such as sponge, cotton, pumice-stone, or coke, as the case may demand, to produce a division of the gas when passing through the tube.

The mixture in the generator might stand at rest, when not fully exhausted, for days or even weeks. It will produce ozone or ozonized air as soon as the air-pump or blower is set in operation.

I apply this process by blowing ozone or ozonized air, generated in the manner above described, into tubs, casks, barrels, or other vessels filled with fermenting or fermented wine, mast, mash, or other saccharine liquids or its productions, also in vegetable oils and mineral oils, for the purpose of improving fermentation, taste, flavor, and quality.

The action of ozone or ozonized air on alcoholic liquors has been known for years, and various ways and means have been applied for producing the same. Some have been secured by Letters Patent. In the patent of Wm. Mont Storm, No. 57,009, 1866, an application is made of inactive oxygen and a current of electricity through the liquids. In the patent of James M. Crafts, No. 80,459, July, 1868, heat, pressure, rotation, and electricity are applied. In Letters Patent of Oscar Loen, 107,071, September 1870, the blowing of atmospheric air through a flame is applied.

My invention, to produce ozone or ozonized air in the manner above described, differs from those named entire in its character, in the difference of the material from which it is produced and in the different way of its application, by not using heat, electricity, violent rotation, or inactive oxygen, which latter is produced by the heating of the oxide of manganese.

The simplicity of my process is shown in the specification. The practicability and the usefulness is proved by many successful trials on large scales.

I do not claim the blowing of atmospheric air directly into the liquids. I also disclaim the application of heat, electricity, or rotating apparatus, or the use of inactive oxygen.

What I claim as my invention, and desire to secure by Letters Patent, is—

1. The generation of ozone or ozonized air, substantially in the manner above described.

2. The application of the so-generated gas on fermenting and fermented saccharine liquids, as above named, and the productions thereof.

3. The application of the product of the generation, in the manner above described, on vegetable and mineral oils.

THEODORE A. HOFFMANN.

Witnesses:
   THEO. WILKINS,
   NORMAN PARSONS.